United States Patent
Wendt et al.

[15] 3,681,977
[45] Aug. 8, 1972

[54] ULTRASONIC ENCEPHALOGRAPHIC SYSTEM

[72] Inventors: John A. Wendt, Park Ridge; Peter J. Rosauer, Mt. Prospect, both of Ill.

[73] Assignee: Champion Spark Plug Company, Toledo, Ohio

[22] Filed: Aug. 2, 1965

[21] Appl. No.: 476,321

[52] U.S. Cl. ............................... 73/67.9, 128/2 R
[51] Int. Cl. ........................................ G01n 29/00
[58] Field of Search ..................... 73/67.5–67.9; 128/2, 2.1

[56] References Cited

UNITED STATES PATENTS

| | | | |
|---|---|---|---|
| 2,871,404 | 1/1959 | Mugele | 73/67.7 |
| 3,050,988 | 8/1962 | Gordon | 73/67.5 |
| 3,323,512 | 6/1967 | Clynes | 73/67.7 X |

OTHER PUBLICATIONS

Robinson, D. E. et al., The C.A.L. Two Channel Ultrasonic Neuroscope, Commonwealth Acoustic Laboratories Report No. 23, March 1964, Commonwealth of Australia, Dept. of Health.
Lithander, Brita, A Control Method for Echo-Encephalography, Acta Psychiat, Scandinav., Vol. 35, p. 235– 240, 1960.
Gordon, D., Echo-Encephalography; British Medical Journal, June 13, 1959, p. 1500– 1504.
Robinson, D. E. et al.; The C.A.L. Two-Channel Echo-Encephaloscope, Ultrasonics, April-June 1965, p. 69– 74.

*Primary Examiner*—Richard C. Queisser
*Assistant Examiner*—John P. Beauchamp
*Attorney*—Hill, Sherman, Meroni, Gross & Simpson

[57] ABSTRACT

Ultrasonic encephalographic system in which left and right transmitting-receiving transducers are positioned on opposite sides of the head and in which three separate A-scan traces are produceable on an oscilloscope screen, the first being produceable by transmission and reception by the left transducer, the second being produceable by transmission and reception by the right transducer and the third being produceable by transmission from one transducer and reception by the other. The traces can be readily compared to accurately locate the midline of the brain. Specific features relate to arrangements for selectively controlling operation to obtain information desired for diagnostic purposes, a foot switch being preferably provided for such control purposes.

6 Claims, 4 Drawing Figures

ULTRASONIC ENCEPHALOGRAPHIC SYSTEM

This invention relates to an ultrasonic encephalographic system and more particularly to a system which will provide a direct and highly accurate indication of the location of the midline of the brain in a highly reliable manner.

Various ultrasonic systems have heretofore been proposed for investigation of the internal structure of the brain by the pulse-echo technique, wherein a pulse of ultrasonic energy is transmitted through the skull into the brain to be reflected from interfaces of structures having different velocity of transmission characteristics, the time of reception of received signals being measured, usually by means of an oscilloscope having a sweep circuit synchronized with the transmission of the pulses.

With such systems, very useful clinical information can be obtained. For example, it is possible to locate the midline of the brain, which is a longitudinal cerebral fissure extending from the back to the front of the cerebrum and almost completely dividing it into two hemispheres. Normally, the midline is quite accurately located at equal distances from the opposite sides of the skull and it is found that shifts in the position of the midline oftentimes indicate the presence of tumors or lesions or the like. With previous ultrasonic systems, it has been possible to determine the location of the midline, but the measurement has been difficult and time-consuming and subject to inaccuracies.

This invention was evolved with the object of providing an ultrasonic system which would provide a direct and accurate indication of the location of the midline of the brain in a highly reliable fashion.

Another object of the invention is to provide an ultrasonic encephalographic system which is comparatively simple in operation and yet very versatile.

According to this invention, a pair of transducer means are engaged with opposite left and right side portions of the head with at least one of the transducers being energized to transmit pulses into the head and with both being arranged for receiving pulses, the respective times of reception of pulses at the transducers relative to the transmission thereof being equal when the midline is midway between the left and right side portions engaged by the transducers. Provision is made for directly comparing the respective times, so as to provide a means for rapidly determining whether the midline is properly located.

In accordance with a specific feature of the invention, both transducers are energized to transmit pulses into the brain and both are effective to receive echoes back at pulse-echo times which are equal when the midline is midway between the transducers.

According to another specific feature of the invention, one of the transducers is energized to transmit pulses while the other is arranged to receive pulses, at a through-transmission time dependent upon the distance from one transducer to the other, the through-transmission time being compared with the pulse-echo time required to transmit a pulse from one transducer and receive it back at the same transducer.

According to a further feature of the invention, provision is made for using a comparison of two pulse-echo times with each other and with a through-transmission time.

Additional important features of the invention relate to the use of an oscilloscope for producing directly comparable indications of the respective times. In accordance with one feature, indications are produced on spaced parallel traces on a common time base, to permit the direct comparison. Another feature relates to the production of pip indications at one polarity in the response to reception of pulses at one transducer and pip indications of the opposite polarity in response to reception of pulses at the other transducer.

Further features of the invention relate to electronic circuit arrangements for effecting the properly synchronized operation of the transducers and the reception and indication of pulses.

Additional features relate to the provision of switching means and control circuitry for obtaining indications required for proper calibration of the system and checking of its operation, and interpretation of results.

This invention contemplates other objects, features and advantages which will become more fully apparent from the following detailed description taken in conjunction with the accompanied drawings which illustrate a preferred embodiment and in which:

Figure 1:
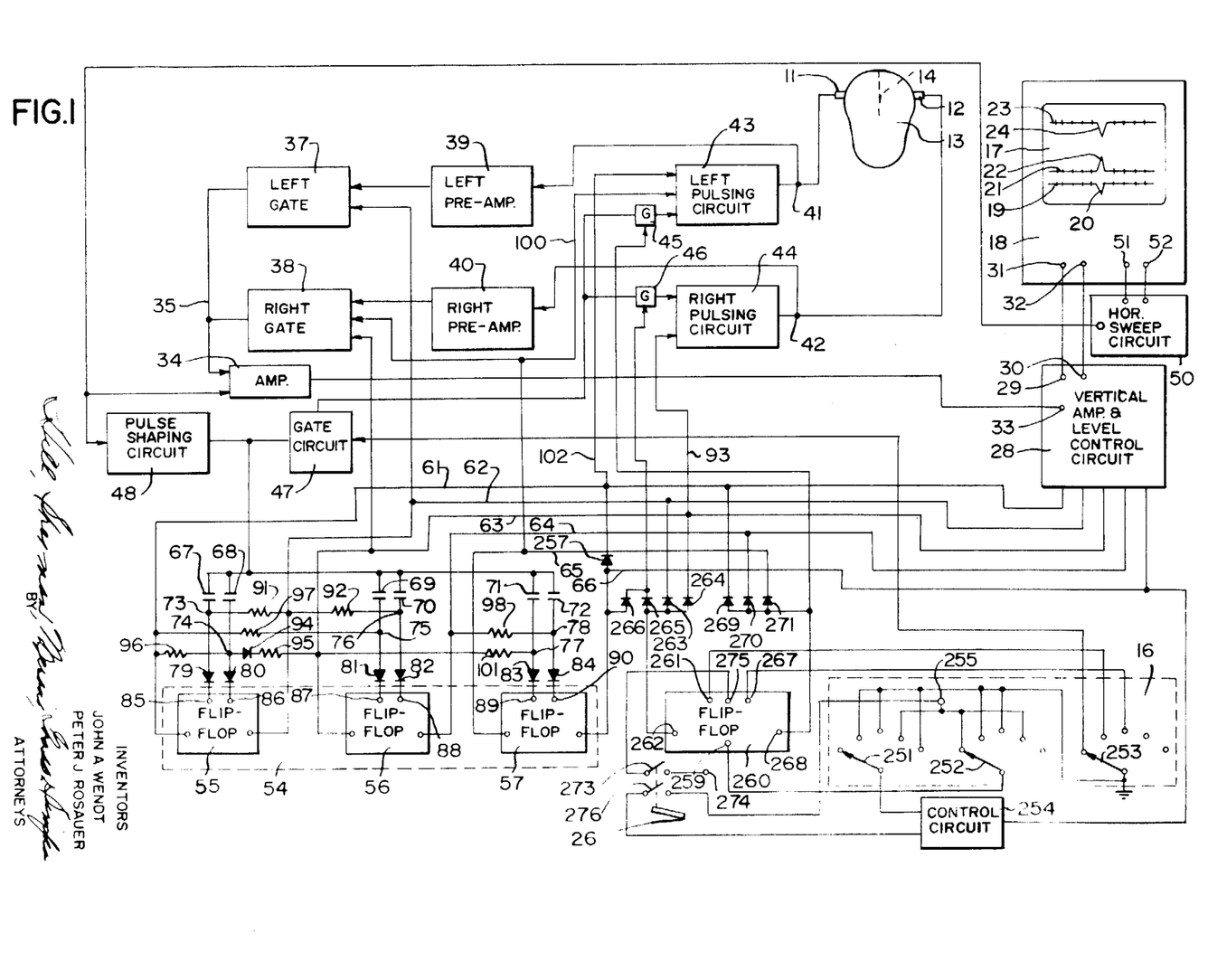
FIG. 1 is a diagrammatic block diagram of an ultrasonic encephalographic system constructed according to the invention.

Reference numeral 10 generally designates an ultrasonic system constructed according to the principles of this invention and specifically designed for use as an encephalographic system for investigation of the interior structure of the brain, although features of the invention have other applications.

In the illustrated system, left and right transducers 11 and 12 are placed against the left and right sides of the head 13 of a patient being examined, as diagrammatically illustrated. With the system, it is possible to locate the midline of the brain, which is a longitudinal cerebral fissure extending from the back to the front of the cerebrum and almost completely dividing it into two hemispheres. Shifts in the position of the midline from an accurately centered position oftentimes indicate the presence of tumors or lesions or the like, and thus it is possible to diagnose brain tumors with the system. In FIG. 1, the midline is indicated diagrammatically by dotted line 14.

The system has several modes of operation which are controlled by a three gang selector switch 16 and in each mode of operation, indications are produced on a screen 17 of an oscilloscope 18.

In a first mode of operation, referred to as an automatic mode, the left transducer 11 is pulsed in synchronism with a horizontal sweep of a spot across the screen 17, and an echo from the midline will produce a downward deflection of the spot, thereby producing a trace 19 having a downward "pip" indication 20. The right transducer 12 is then pulsed in synchronism with a second sweep of the spot, and an echo from the midline is operative to produce an upward deflection of the spot, thereby producing a trace 21 having an upward "pip" indication 22. The left transducer is then pulsed again in synchronism with a third sweep of the spot, while the right transducer is used for receiving, and an electrical signal produced by passage of the pulse of ultrasonic energy through the head is used to produce a downward deflection of the spot, thereby producing a trace 23 having a downward "pip" indication 24.

Such sweeps are repeated cyclically in rapid sequence and through persistence of vision, a stationary pattern is produced on the screen 17. In addition to the pip indications, the traces 19, 21 and 23 may also contain conventional marker pulses.

The horizontal sweep is controlled from the same circuit, and a common time base is provided for all three traces. If the midline is accurately centered, the pips 20, 22 and 24 will be vertically aligned on the screen 17. However, if the midline is shifted in one direction or the other from the centered position, the pip indications 20 and 22 will shift, while the through-transmission indication 24 will remain stationary. Thus if the midline is closer to the left transducer 11 than to the right transducer 12, the pip indication 20 will move to the left while the pip indication 22 will move to the right on the face of the screen 17.

In a second mode of operation, the left transducer is pulsed and is used to receive on each sweep of the spot across the screen 17, and only the trace 19 is produced.

In a third mode of operation, the right transducer is pulsed and is used to receive on each sweep, to produce only the trace 21.

In a fourth mode of operation, the left transducer 11 is pulsed and the right transducer 12 is used to receive in synchronism with each sweep, to produce only the trace 23.

Accordingly, the operator may select a mode of operation according to particular conditions which he desires for particular diagnostic purposes.

In a fifth mode of operation, a foot switch 26 is usable to selectively obtain either of the second, third and fourth modes of operation described above, i.e., the left mode, the right mode and the through-transmission mode.

With this feature, the examining physician has both hands free to hold the transducers 11 and 12 during examination and may switch between the three modes without putting the transducers down and losing the established positions of placement. As described more in detail hereinafter, either the left mode or the right mode of operation is produced upon switching to the foot switch operation, and by lightly depressing and releasing the foot switch, the operation may be switched from left to right or from right to left. To obtain the through-transmission mode, the foot switch 26 is depressed all the way down.

To control vertical deflection of the spot on the screen 17 and thus produce the pip indications, as well as to produce the proper level separation of the three traces, a vertical amplifier and level control circuit 28 is provided having output terminals 29 and 30 connected to terminals 31 and 32 of the oscilloscope 18, which are connected to vertical deflection plates of a cathode ray tube therein. The vertical amplifier and level control circuit 28 has an input terminal 33 which is connected to the output of an amplifier 34. Amplifier 34 has an input connected through a line 35 to the outputs of a pair of gate circuits 37 and 38 having inputs connected through preamplifier circuits 39 and 40 to terminals 41 and 42 which are respectively connected to the left and right transducers 11 and 12.

To pulse the transducers 11 and 12, the terminals 41 and 42 are connected to the outputs of left and right pulser circuits 43 and 44. Pulser circuits 43 and 44 have one pair of inputs connected through gate circuits 45 and 46 to the output of a gate circuit 47 which is connected to the output of a pulse shaper circuit 48. The input of the shaper circuit 48 is connected to an output from a horizontal sweep generator circuit 50 having output terminals connected to terminals 51 and 52 of the oscilloscope 18, connected to horizontal deflection plates of the cathode ray tube thereof. In the left, right and through-transmission modes, the gate circuit 47 is enabled and one or the other of the gates 45 or 46 is enabled, to obtain pulsing of the proper transducer. In the automatic mode of operation, input signals are applied to the left and right pulsing circuits 43 and 44 from a shift register generally indicated by reference numeral 54 and including three flip flops 55, 56 and 57. The shift register unit 54 also controls the gates 37 and 38 to apply received signals from the proper transducer, and in addition, it controls the vertical amplifier and level control circuit 28 to obtain the proper separation of the traces 19, 21 and 23.

SHIFT REGISTER OPERATION

The shift register 54 has six outputs connected to lines 61–66, lines 61 and 62 being connected to left and right output terminals of the flip flop 55, lines 63 and 64 being connected to left and right outputs of the flip flop 56, and lines 65 and 66 being connected to left and right outputs of the flip flop 57. In the automatic mode of operation signals from the flip flop 55 control the left pulsing circuit 43 and the left gate circuit 37, and flip flop 55 may be referred to as the left or "L" flip flop. Similarly, flip flops 56 and 57 may be referred to as the right or "R" and through-transmission or "T" flip flops, respectively.

In the particular circuit as illustrated, the potentials of the output lines 61–66 are shifted between a potential approximately equal to that of a negative power supply voltage, 12 volts for example, and a voltage close to ground potential. In the automatic mode of operation, the flip flops may be considered as being initially in conditions for the left portion of the operation, such that the left pulser has been pulsed, and the left gate is open. Under such conditions, lines 61, 64 and 66 are at negative potentials and lines 62, 63 and 65 are effectively at ground potential.

Under such conditions, a signal is applied to the left gate circuit 37 to cause transmission of pulses from the preamplifier circuit 39 to the amplifier 34, while signals are applied to the right gate circuit 38 to prevent transmission of signals therethrough.

Positive pulses which are synchronized with the horizontal sweep, are applied from the shaping circuit 48 through capacitors 67–72 to circuit points 73–78 which are connected through diodes 79–84 to input terminals 85–90 of the flip flops 55–57.

In the left condition of the flip flops as above described, line 62 is at ground potential, effectively, and through a resistor 91 the potential level is established at circuit point 73 sufficient to cause a positive triggering pulse applied through capacitor 67 to be applied through diode 79 to the input terminal 85 and to trigger the flip flop 55. At the same time, a similar signal is applied through a resistor 92 to the circuit point 76 to allow a positive pulse applied through capacitor 70 and through diode 82 to the terminal 88 to trigger the flip flop 56. The flip flop 57, however, is not triggered.

Thus in the right condition of the circuit, the lines 62, 63 and 66 are at negative potentials, while lines 61, 64 and 65 are effectively at ground potential. At this time, the left gate circuit 37 is closed, a negative signal from line 62 being applied thereto. At the same time, the gate 38 is opened, a negative signal being applied thereto from line 63, the particular construction of gates 37 and 38 being such that a negative signal will close gate 37, but open gate 38.

It should also be noted that in switching from the left condition to the right condition, a negative-going signal is developed at the line 63 which is applied through line 93 to the right pulsing circuit 44, effective to cause a pulse to be applied to the right transducer 12.

With the flip flops in the right condition, the circuit point 74 is clamped to a potential which is relatively highly negative, because of its connection through a diode 94 and a resistor 95 of relatively low value to the line 63 which is then at a negative potential. As a result, flip flop 55 is not switched, even though circuit point 74 is connected through a resistor 96 to the line 61 which is then at ground potential. Resistor 96 is of a relatively high value as compared to resistor 95.

At this time, in the right condition of the flip flops, circuit point 75 is at a potential approximately equal to ground potential, by virtue of its connection through a resistor 97 to line 61, and the positive voltage pulse applied from the shaping circuit 48 is effective to trigger the flip flop 56. Also, circuit point 78 is placed at ground potential through its connection to line 64 through a resistor 98 and flip flop 57 is triggered by a positive voltage pulse.

Accordingly, in the through-transmission portion of the automatic operation, the lines 62, 64 and 65 are at negative potentials while lines 61, 63 and 66 are at ground potential. The gate 38 is then enabled by the signal applied from line 65, and in going from the right condition to the through-transmission condition, a negative-going signal is applied to the left transducer circuit 43 from line 65 through a line 100, to pulse the left transducer 11.

Gate 37 is again closed by the negative signal applied from line 62.

In the through-transmission condition, diode 94 and resistor 95 are no longer effective to clamp the circuit point 74 to a negative potential, since line 63 is then at ground potential and circuit point 74 is placed at ground potential through its connection through resistor 96 to the line 61. Accordingly, the next positive pulse applied from the shaping circuit 48 will be effective to trigger the flip flop 55. At this time, the conditions are such that flip flop 56 will not be triggered, but with respect to flip flop 57, circuit point 77 is connected through a resistor 101 to the line 63 to place it at ground potential such that a positive pulse as applied through the diode 83 to terminal 89 will trigger the flip flop 57. Thus the flip flops are restored to the initial left condition.

It should be noted that in switching to the left condition, a negative-going signal is developed at the line 61 which is applied through a line 102 to the left pulsing circuit 43 to apply a pulse to the left transducer 11.

Figure 2:
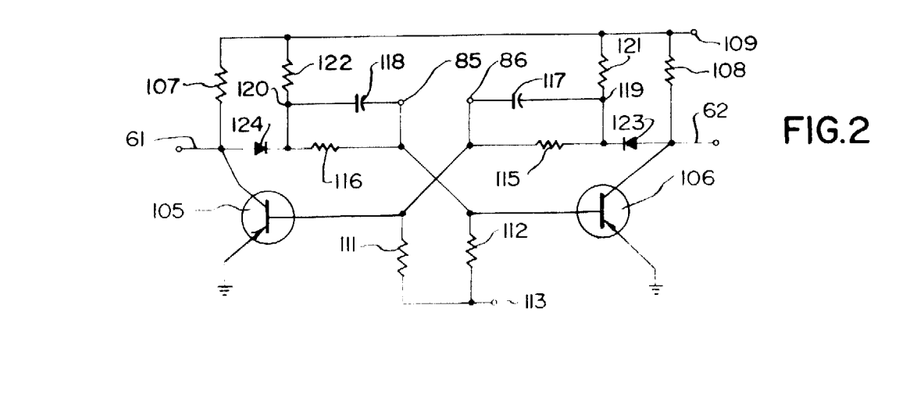
FIG. 2 is a circuit diagram of a flip flop operative as a shift register stage in the system of FIG. 1.

FIG. 2 illustrates the circuit of the flip flop 55 which is identical to those of the flip flops 56 and 57. As shown, two transistors 105 and 106 are provided having emitters connected to ground and collectors connected to the lines 61 and 62 and also connected through resistors 107 and 108 to a power supply terminal 109 which may be connected to a negative 12 volt supply, for example. The base electrodes of the transistors 105 and 106 are connected to the trigger input terminals 86 and 85, respectively, and are also connected through resistors 111 and 112 to a power supply terminal 113 which may be connected to a positive 12 volt supply, for example. Cross-couplings are provided to render each transistor conductive when the other is non-conductive. In particular, the base electrodes of transistors 105 and 106 are respectively connected through resistors 115 and 116 and parallel capacitors 117 and 118 to circuit points 119 and 120 which are connected through resistors 121 and 122 to the negative power supply terminal 109 and also through diodes 123 and 124 to the collectors of the transistors 106 and 105, respectively.

In operation, with transistor 105 conductive the collector thereof is effectively at ground potential and through the voltage-dividing action of the resistors 116 and 112, a voltage is applied to the base of the transistor 106 which is sufficiently positive to bias the transistor 106 to a non-conductive state. Under such conditions, positive input pulses applied to the terminal 105 can have no effect on the transistor 106 which is already non-conductive. Positive input pulses applied to the terminal 86, however, will reduce conduction of the transistor 105 to move the potential of the collector thereof in a negative direction and when the base of the transistor 106 becomes sufficiently negative, the transistor 106 will start to conduct to apply positive-going signal back to the base of the transistor 105, further reducing conduction thereof. As a result, the circuit is rapidly switched to a condition wherein the transistor 106 is heavily conductive, with the transistor 105 being cut off.

VERTICAL AMPLIFIER AND LEVEL CONTROL CIRCUITRY

Figure 3:
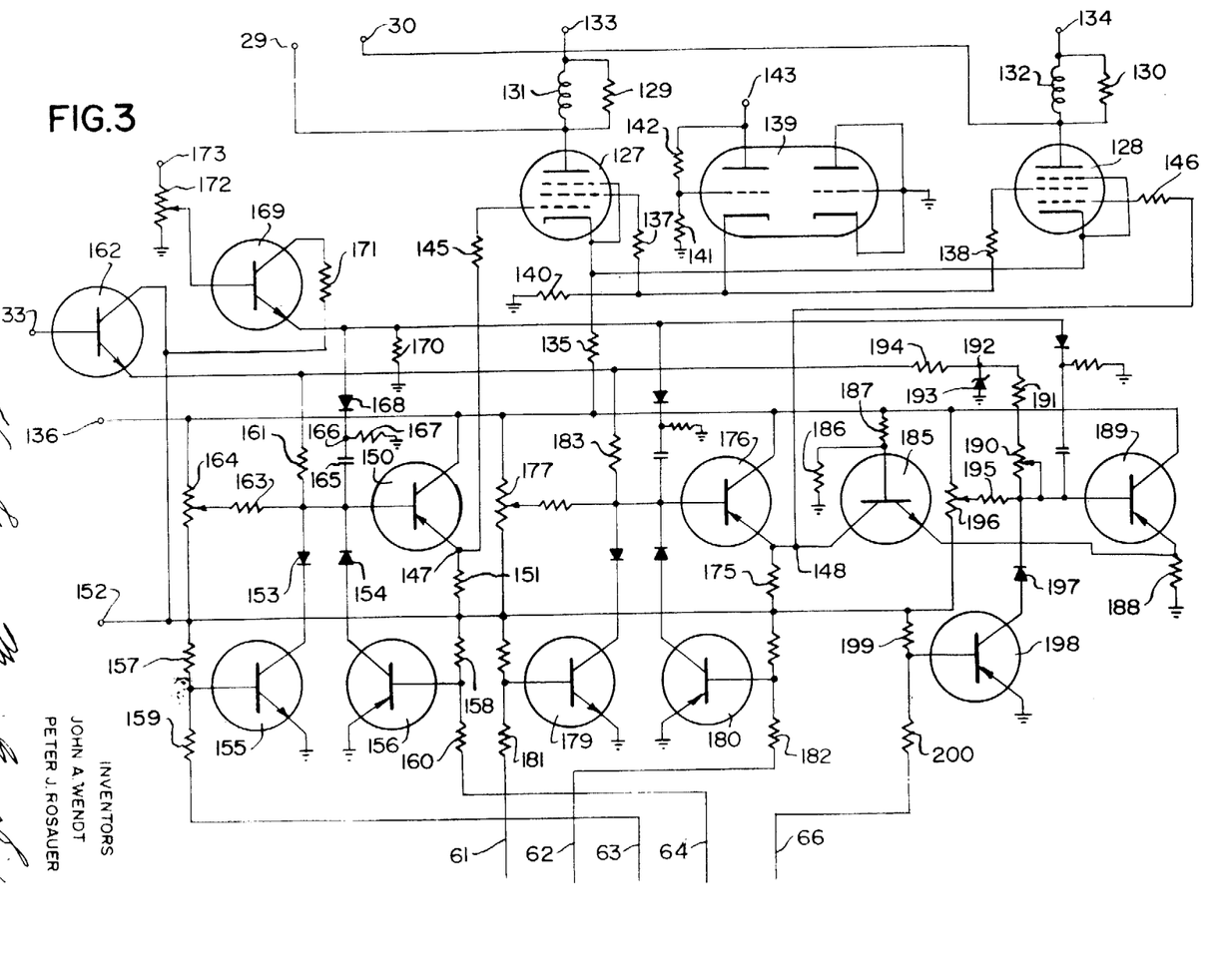
FIG. 3 is a circuit diagram of a vertical amplifier and level control circuit of the system of FIG. 1.

FIG. 3 illustrates the circuit of the vertical amplifier and level control unit 28. As above described, the unit 28 controls vertical deflection of the spot on the screen 17 to produce the pip indications and also produces the proper level separation of the three traces 19, 21 and 23.

The output terminals 29 and 30 of the unit 28, which are connected to the vertical deflection plates, are connected to the plates of a pair of pentodes 127 and 128 and also through resistors 129 and 130 and parallel inductors 131 and 132 to power supply terminals 133 and 134. The cathodes of the pentodes 127 and 128 are connected together and through a resistor 135 to a terminal 136, which may be connected to a negative 12 volt supply, for example. The screen grids of the pentodes 127 and 128 are connected through resistors 137 and 138 to the cathode of a control tube 139 and also through a resistor 140 to ground. The control grid of the control tube 139 is connected through a resistor 141 to ground and also through a resistor 142 to a power supply terminal 143 which is also connected to the plate of the control tube 139. The terminals 133, 134 and 143 are connected to sources of relatively high positive voltage, which may be the same source, or preferably a source which allows adjustment of the relative voltages at terminals 133 and 134 for overall adjustment of the vertical position of the pattern produced on the screen of the oscilloscope.

To control the current through the pentodes 127 and 128 and to thus control the relative potentials of the plates thereof and control vertical deflection, the grids of the pentodes 127 and 128 are connected through resistors 145 and 146 to circuit points 147 and 148.

During the left mode of operation, or during the left portion of the automatic mode of operation, the circuit point 147 is essentially at ground potential, while the video signal is developed at the circuit point 148 containing positive pulses in response to the echo signals from the midline, to cause the pentode 128 to conduct more heavily, and to produce a negative pulse at the output terminal 30, so as to produce a downward pip indication on the face of the screen 17, terminal 30 being connected to the upper deflection plate. At this time, the level at the circuit point 148 is fixed so that the trace is produced in the lower portion of the screen 17.

During the right mode of operation, or during the right portion of the automatic mode, the circuit point 148 is essentially at ground potential, while a video signal is developed at circuit point 147 containing positive pulses corresponding to echo signals, producing increased current flow through the pentode 127 and negative pulses at the plate thereof, so as to produce upward pip indications, terminal 29 being connected to the lower deflection plate of the oscilloscope.

During the through-transmission mode of operation, or during the through-transmission portion of the automatic mode, the operation is similar to that in the left mode, except that the level of the signal at the circuit point 148 is shifted to produce the trace 23 on the upper portion of the screen 17.

Circuit point 147 is connected to the emitter of a transistor 150 and also through a resistor 151 to a power supply terminal 152 which may be at a positive 12 volt potential, for example. The collector of the transistor 150 is connected to the negative power supply terminal 136, while the base thereof is connected through diodes 153 and 154 to the collectors of a pair of transistors 155 and 156 having emitters connected to ground and base electrodes connected through resistors 157 and 158 to the terminal 152 and through resistors 159 and 160 to the lines 63 and 64.

During the left and through-transmission modes of operation, the line 63 is at ground potential while line 64 is at a negative potential, to place the base electrodes of transistors 155 and 156 at positive and negative potentials and to cause conduction of both transistors. As a result, the potential of the base of the transistor 150 is effectively clamped at ground potential, and a potential is developed at circuit point 147 which is effectively equal to ground potential.

During the right transmission mode of operation, the transistors 155 and 156 are cut off and a video signal at a certain level is applied to the base of the transistor 150. In particular, the base is connected through a resistor 161 to the emitter of a transistor 162 having its collector connected to the positive power supply terminal 152 and having its base connected to the video input terminal 33. The base of the transistor 150 is also connected through a resistor 163 to the movable contact of a potentiometer 164 connected between the positive and negative power supply terminals 152 and 136. Accordingly, during the right mode of operation, a video signal is developed at the base of transistor 150, and its level may be fixed by adjustment of the potentiometer 164, to obtain the desired vertical position of the trace 21.

To apply marker pulses, the base of the transistor 150 is also connected through a capacitor 165 to a circuit point 166 connected through a resistor 167 to ground and through a diode 168 to the emitter of a transistor 169, the emitter being also connected through a resistor 170 to ground. The collector of transistor 169 is connected to a resistor 171 to the positive power supply terminal 152 and the base thereof is connected to the movable contact of a potentiometer 172 connected between ground and a terminal 173, to which a source of marker pulses is connected.

The circuit point 148 is connected through a resistor 175 to the positive power supply terminal 152 and to the emitter of a transistor 176 which is connected in a circuit arrangement substantially identical to that in which the transistor 150 is connected, and including a potentiometer 177 corresponding to the potentiometer 164 and also including a pair of transistors 179 and 180 having base electrodes connected through resistors 181 and 182 to the lines 61 and 62. During the right and through modes of operation, the transistors 179 and 180 are maintained conductive by signals applied on lines 61 and 62 to clamp the potential at the base of transistor 176 at ground potential. During the left mode of operation, a video signal is applied to the base of the transistor 176 through a resistor 183, while the level of that video signal is adjustable by adjustment of the potentiometer 177, to position the trace 19 along the lower portion of the screen 17.

To apply a video signal and fix the level in the through-transmission mode, the circuit point 148 is connected to the collector of a transistor 185 having its base connected through a resistor 186 to ground and through a resistor 187 to the negative power supply terminal 136, and having its emitter connected through a resistor 188 to ground and to the emitter of a transistor 189. The collector of transistor 189 is connected to the negative power supply terminal 136 while the base thereof is connected through an adjustable resistor 190 and a fixed resistor 191 to a circuit point 192 connected to ground through a Zener diode 193 and through a resistor 194 to the emitter of the transistor 162. The base of the transistor 189 is also connected through a resistor 195 to the movable contact of a potentiometer 196 connected between the negative and positive power supply terminals 136 and 152.

In the through-transmission mode, video pulses developed from the right transducer are applied through the transistor 162 and resistor 194 to the circuit point 192 at which the amplitude thereof is limited by the Zener diode 193. The limited pulses are applied therefrom through the resistors 191 and 190 to the base of the transistor 189 to develop corresponding pulses at the emitter of transistor 189 which are applied through the transistor 185 to the circuit point 148. During such operation, the transistor 185 is maintained conductive, the relative values of resistors 186 and 187 being such as to maintain the base of the transistor 185 at a positive potential relative to the emitter thereof which is at a negative potential due to current flow through the resistor 188 and transistor 189. The relative level of the signal is adjustable by adjustment of the potentiometer 196, to position the trace 23 on the upper portion of the screen 17.

To prevent transmission of signals through transistors 189 and 185 in the left and right modes of operation, the base of transistor 189 is connected through a diode 197 to the collector of a transistor 198 having its emitter connected to ground and having its base connected through a resistor 199 to the positive power supply terminal 152 and through a resistor 200 to the line 66. In the left and right modes of operation, the line 66 is at a negative potential, to cause conduction through the transistor 198 and to clamp the base of the transistor 189 at a potential approximately equal to ground potential. The emitter of the transistor 189 will then be at ground potential, and with a negative potential at the base of the transistor 185, the transistor 185 will be cut off.

It may be noted that marker pulses are applied to the base electrodes of transistors 176 and 189, through circuitry substantially identical to that applying such pulses to the base of transistor 150.

GATING, PRE-AMPLIFIER AND PULSER INPUT CIRCUITRY

Figure 4:
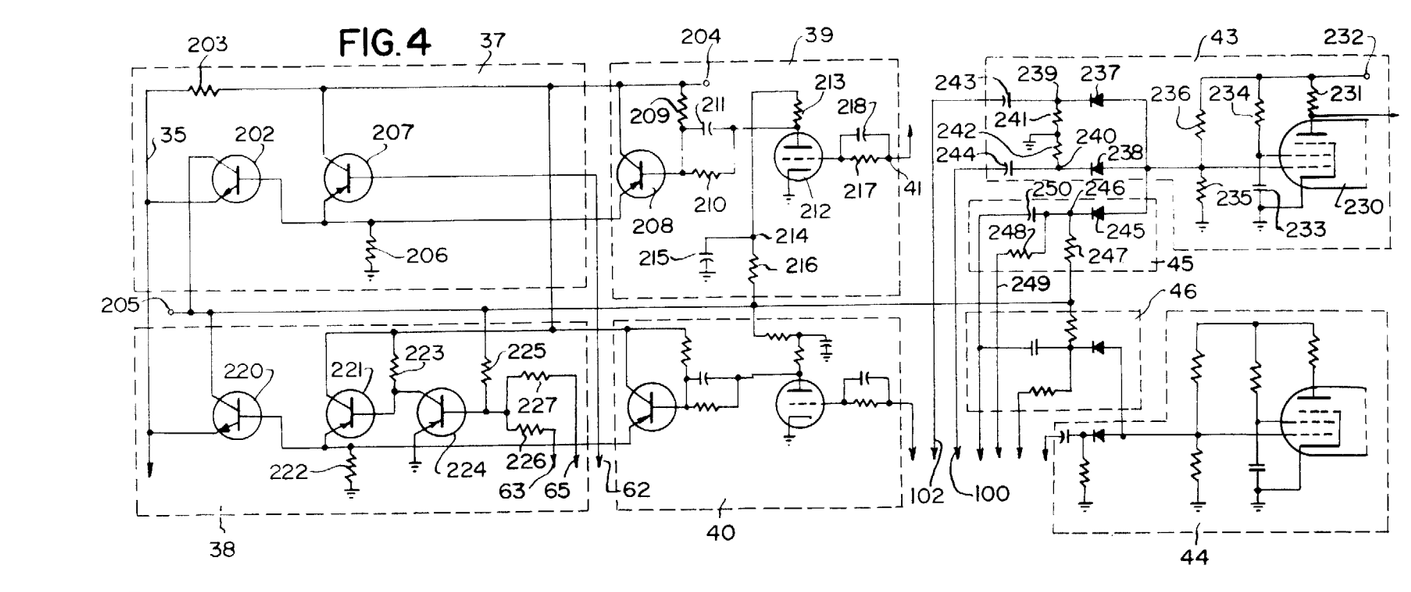
FIG. 4 is a circuit diagram showing gates, preamplifiers and pulser input circuits used in the system of FIG. 1.

Referring now to FIG. 4, the gate 37 includes a transistor 202 having its emitter connected to the line 35, which is connected to the input of the amplifier 34, as shown in FIG. 1, and is also connected through a resistor 203 to a power supply terminal 204 which may be at a negative 12 volts relative to ground. The collector of the transistor 202 is connected to a power supply terminal 205, which may be connected to a source at a positive 12 volts relative to ground, and the base of transistor 202 is connected to ground through a resistor 206 and also to the emitter of a transistor 207 having its collector connected to the negative power supply terminal 204 and havings its base connected to the line 62 from the shift register circuit 54.

During the right and through-transmission modes of operation, a highly negative voltage is applied on line 62 to render the transistor 207 highly conductive and to clamp the emitter thereof at a potential close to that of the negative power supply terminal 204. The transistor 202 is then cut off to prevent transmission of signals to the output line 35. During the left mode of operation, however, the line 62 is approximately at ground potential and the transistor 207 is substantially cut off while the transistor 202 is conductive to apply signals to the output line 35.

To apply signals to the gate circuit 37, the base of transistor 202 together with the emitter of transistor 207 are connected to an output transistor 208 of the preamplifier circuit 39. The collector of the transistor 208 is connected to the negative power supply terminal 204, while the base thereof is connected through a resistor 209 to the terminal 204 and through the parallel combination of a resistor 210 and a capacitor 211 to the plate of a triode 212. The cathode of the triode 212 is connected to ground, while the plate thereof is connected through a resistor 213 to a circuit point 214 connected through a bypass capacitor 215 to ground and through a resistor 216 to the positive power supply terminal 205. The grid of the triode 212 is connected through a resistor 217 and a capacitor 218 in parallel to the terminal 41 which is connected to the left transducer 11.

The right gate circuit 38 comprises a pair of transistors 220 and 221 connected in the same manner as the transistors 202 and 207 of a left gate circuit 37, with a resistor 222 between ground and the base of transistor 220 and the emitter of transistor 221, such being connected to the output of the right preamplifier 40 which has a circuit identical to that of the left preamplifier 39. The base of the transistor 221 is connected through a resistor 223 to the negative power supply terminal 204 and is also connected to the collector of a transistor 224 having a grounded emitter and having a base electrode connected through a resistor 225 to the positive power supply terminal 205 and also through resistors 226 and 227 to lines 63 and 65, respectively.

In operation, during the left mode of operation, or the left portion of the automatic operation, both lines 63 and 65 are at ground potential and the transistor 224 is non-conductive, so that the base of transistor 221 is at a potential equal to that of the negative power supply terminal 204, with the transistor 221 being then highly conductive, and with the transistor 220 being cut off. During the right and through-transmission modes, however, a negative signal is applied on one or the other of the lines 63 and 65 to render the transistor 224 conductive, to cut off the transistor 221 and to render the transistor 220 conductive to transmit video signals to the line 35.

The left pulser has an input stage including a pentode 230 having a grounded cathode, and a plate connected through a resistor 231 to a positive power supply terminal 232 which may be at plus 300 volts relative to ground. The plate is connected to subsequent stages of the pulser circuit, operative to apply a high energy pulse to the transducer 11 in response to a positive pulse at the plate of the pentode 230. The screen grid of the pentode 230 is connected through a bypass capacitor 233 to ground and through a resistor 234 to the positive power supply terminal 232, and the grid thereof is connected to ground through a resistor 235 and to terminal 232 through a resistor 236. Thus a positive voltage is normally applied to the grid of the pentode 230 and the pentode normally conducts heavily. To develop a pulse at the plate thereof, a negative pulse is required at the grid.

The grid of the pentode 230 is connected through diodes 237 and 238 to circuit points 239 and 240 connected through resistors 241 and 242 to ground and connected through capacitors 243 and 244 to the lines 102 and 100. The capacitors 243 and 244 and resistors 241 and 242 form differentiating circuits having a comparatively short time constant to develop on the lines 102 and 100, such lines being connected to outputs of the shift register 54 as above described.

The grid of the pentode 230 is additionally connected through a diode 245 in the gate circuit 45 to a circuit point 246 therein, circuit point 246 being connected through a resistor 247 to the positive power supply terminal 205. Circuit point 246 is also connected through a resistor 248 to a control line 249, and in addition through a capacitor 250 to the output of the gate circuit 47 which operates to supply negative pulses. The control line 249 may either be at a negative potential (minus 12 volts, for example), or at ground potential. When at a negative potential, the circuit point 246 is placed at a value close to ground potential, and negative pulses applied through the capacitor 250 continue through diode 245 to the grid of the pentode 230 to cut off or sharply reduce conduction thereof. When the control line 249 is at ground potential, however, the potential of the circuit point 246 is sufficiently positive to prevent transmission of pulses through the diode 245.

The circuit of the gate 46 is substantially identical to that of the gate 45, and the input circuitry of the right pulsing circuit 44 is similar to that of the left pulsing circuit 43, except that one less input is required.

SWITCHING CIRCUITRY

Referring again to FIG. 1, the switching circuitry includes the three gang selector switch 16 having three movable contacts 251, 252 and 253 which are illustrated in positions for automatic operation. At the contacts are moved in a clockwise direction as illustrated, they are moved progressively through a left position, a right position, a through-transmission position and thence to a final foot control position.

The contact 251 is connected to one input of a control circuit 254 having an output connected to the line 66. In the automatic, left and right positions of the contact 251, it is grounded and serves to prevent operation of the control circuit 254. In the through-transmission position, however, the contact 251 is connected to a terminal 255, connected to a negative supply, 12 volts for example, and the control circuit 254 then operates to connect line 66 to ground. This insures proper operation of circuits in the unit 28 and also shifts the flip flop 57 to the proper condition for through-transmission operation. With line 66 grounded, the line 61 is also effectively connected to ground through a diode 257 to shift the flip flop 55 to the proper condition for through-transmission operation. Through the above described circuitry, the flip flop 56 will also be switched to the proper condition for through-transmission operation when flip flops 55 and 57 are so switched.

In the fifth or final position of the switch contact 251, the input of the control circuit 254 is again grounded, but the foot switch 26 can control the circuit 254 as hereinafter described.

The contact 252 in the automatic position as illustrated connects the negative power supply terminal 255 to an input terminal 259 of a flip flop circuit 260 which similar to, although not exactly the same as, the flip flop circuits 55–57. With a negative voltage applied to terminal 259, the flip flop circuit 260 is inoperative. However, in both the left and right positions of the switch, the terminal 259 is connected to ground to permit operation of the flip flop 260. In the through-transmission position, the negative voltage is again applied to prevent operation of the flip-flop circuit 260 and in the foot switch position, the operation is controlled from the foot switch 26 as hereinafter described.

With regard to the switch contact 253, it operates to connect ground to an input of the gate circuit 47 to render it inoperative in the automatic position. In the left and right positions, however, the input of the gate circuit 47 is ungrounded to permit application of pulses from the shaping circuit 48 to the inputs of the left and right pulsing circuits 43 and 44. In the left position of the switch contact 253, it connects ground to a terminal 261 of the flip flop circuit 260 and then operates to connect an output terminal 262 of the flip flop circuit 260 to ground. With terminal 262 connected to ground, lines 62 and 63 are connected to ground through diodes 263 and 264 and the flip flops 55 and 56 are switched to conditions proper for the left mode of operation, the gate circuits 37 and 38 being controlled therefrom. Also, with terminal 262 grounded, a signal is applied through a diode 265 to the gate circuit 46 to prevent operation of the right pulsing circuit 44. It may here be noted that an additional diode 266 is connected between line 66 and the gate 46 to prevent operation of the right pulsing circuit during through-transmission operation.

In the right or third position of the selector switch contact 253, it operates to connect ground to a terminal 267 of the flip flop 260, which operates to connect a terminal 268 to ground, terminal 262 being then connected to a negative voltage source. Terminal 268 is connected through diodes 269, 270 and 271 to lines 61, 64 and 65 and operates to switch the flip flops 55–57 to conditions for the right mode of operation.

When the selector switch contacts are placed in the fifth or foot switch position, the flop flop 260 will be in one condition or the other to connect either terminal 262 or terminal 268 to ground and to cause either left or right mode operation. The operator may then lightly depress the foot switch 26 to close a contact 273 and to connect a positive supply terminal 274 to a terminal 275 of the flip flop 260, which is a common trigger input, such that the flip flop 260 is switched from one condition to the other. Accordingly, the operator can select between the right and left modes of operation by lightly depressing the foot switch 26.

To obtain through-transmission operation, the operator may press the foot switch 26 all the way down to close a contact 276 and to connect the negative supply terminal 255 to the terminal 259 of the flip flop 260, through the selector switch, contact 252 to render the flip flop 260 inoperative, with both terminals 262 and 268 at negative voltages. At the same time, the contact 276 operates to apply a negative voltage to an input of the control circuit 254 which then operates to ground the line 66. At this time, the flip flop 57 is placed in a condition for through-transmission operation and through the diode 257, the flip flop 55 is also placed in a condition for through-transmission operation, flip flop 55 being then operative to switch flip flop 56 for such operation through the interconnection circuitry described above.

It will be understood that modifications and variations may be effected without departing from the spirit and scope of the novel concepts of this invention.

We claim as our invention:

1. In an ultrasonic encephalographic system for determining the location of the midline of the brain, a first transmitting-receiving transducer arranged to be placed against one side of the head, a second transmitting-receiving transducer arranged to be placed against the opposite side of the head in alignment with said first transducer, first pulsing means for causing pulsing of said first transducer, second pulsing means for causing pulsing of said second transducer, an oscilloscope having a screen, a sweep circuit operated periodically at a rapid rate for sweeping a spot across said screen in one direction to produce traces, an amplifier and level control circuit for deflecting said spot in a direction transverse to said one direction and for controlling the position of said traces in said transverse direction, timing means for supplying a timing signal synchronized with the operation of said sweep circuit, a control circuit having first, second and third stable conditions, means responsive to said timing signal for cyclically operating said control circuit through said stable conditions in a predetermined order with said control circuit being in one of said stable conditions during each trace of said spot, means interconnecting said control circuit and said amplifier and level control circuit to place said traces at first, second and third positions on said screen during said first, second and third conditions of said control circuit, first and second received signal gate circuits having inputs coupled to said first and second transducers and having outputs coupled to said amplifier and level control circuit for deflecting said spot in said transverse direction in response to echo signals from said transducers, first and second pulsing gate circuits for applying signals from said timing means to said first and second second pulsing circuits, and means for applying signals from said control circuit to said gate circuits to automatically operate said first pulsing gate circuit and said first received signal gate circuit in said first condition of said control circuits, said second pulsing gate circuit and said second received signal gate circuit in said second condition of said control circuit and said first pulsing gate circuit and said second received signal gate circuit in said third condition of said control circuit.

2. In an ultrasonic encephalographic system as defined in claim 1, mode selector control means having first, second, third and fourth positions, means controlled by said mode selector control means in said first position thereof for effecting said automatic operation of said pulsing and received signal gate circuits from said control circuit, means controlled by said mode selector control means in said second position thereof for disabling said automatic operation of said pulsing and received signal gate circuits from said control circuit and for rendering said first pulsing gate means and said first received signal gate means operative during each operation of said sweep circuit, means controlled by said mode selector control means in said second position thereof for disabling said automatic operation of said pulsing and received signal gate circuits from said control circuit and for rendering said second pulsing gate means and said second received signal gate means operative during each operation of said sweep circuit, and means controlled by said mode selector control means in said fourth position thereof for disabling said automatic operation of said pulsing and received signal gate circuits from said control circuit and for rendering said first pulsing gate means and said second received signal gate means operative during each operation of said sweep circuit.

3. In an ultrasonic encephalographic system as defined in claim 2, foot switch means for operating said mode selector control means into any selected one of said first, second, third and fourth positions thereof.

4. In an ultrasonic encephalographic system as defined in claim 1, said received signals from said first and second transducers applied through said first and second received signal gate circuits to said amplifier and level control circuit being applied with opposite polarities to produce deflections of said spot in opposite directions.

5. In an ultrasonic encephalographic system as defined in claim 1, said control circuit comprising a shift register having first, second and third stages each having first and second stable states, means interconnecting said stages for switching each stage into its first stable state while each of the other two stages is in its second stable state, said timing signal being applied to shift said stages for cyclic operation thereof and to establish said first, second and third stable conditions of said control circuit.

6. In an ultrasonic encephalographic system for determining the location of the midline of the brain, a first transmitting-receiving transducer arranged to be placed against one side of the head, a second transmitting-receiving transducer arranged to be placed against the opposite side of the head in alignment with said first transducer, first pulsing means for causing pulsing of said first transducer, second pulsing means for causing pulsing of said second transducer, an oscilloscope having a screen, a sweep circuit operated periodically at a rapid rate for sweeping a spot across said screen in one direction to produce traces, an amplifier and level control circuit for deflecting said spot in a direction transverse to said one direction and for controlling the position of said traces in said transverse direction, timing means for supplying a timing signal synchronized with the operation of said sweep circuit, a control circuit having first, second and third stable conditions, means responsive to said timing signal for cyclically operating said control circuit through said stable conditions in a predetermined order with said control circuit being in one of said stable conditions during each trace of said spot, means interconnecting said control circuit and said level control circuit to place said traces at first, second and third positions on said screen during said first, second and third conditions of said control circuit, first and second received signal gate circuits having inputs coupled to said first and second transducers and having outputs coupled to said amplifier and level control circuit for deflecting said spot in said transverse direction in response to echo signals from said transducers, first and second pulsing gate circuits for applying signals from said timing means to said first and second pulsing circuits, and means for applying signals from said control circuit to said gate circuits to automatically operate said first pulsing gate circuit and said first received signal gate circuit in said first condition of said control circuit, said second pulsing gate circuit and said second received signal gate circuit in said second condition of said control circuit and said first pulsing gate circuit and said second received signal gate circuit in said third condition of said control circuit.

* * * * *